(12) United States Patent
Kruse et al.

(10) Patent No.: US 10,605,140 B2
(45) Date of Patent: Mar. 31, 2020

(54) HONEYCOMB BODY FOR EXHAUST GAS AFTERTREATMENT

(71) Applicant: CONTINENTAL AUTOMOTIVE GmbH, Hannover (DE)

(72) Inventors: Carsten Kruse, Troisdorf (DE); Peter Hirth, Rösrath (DE); Frank Bohne, Sülzetal (DE); Christian Schorn, Lohmar (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/326,124

(22) PCT Filed: Aug. 15, 2017

(86) PCT No.: PCT/EP2017/070645
§ 371 (c)(1),
(2) Date: Feb. 15, 2019

(87) PCT Pub. No.: WO2018/033527
PCT Pub. Date: Feb. 22, 2018

(65) Prior Publication Data
US 2019/0178138 A1    Jun. 13, 2019

(30) Foreign Application Priority Data

Aug. 16, 2016  (DE) .................. 10 2016 215 289

(51) Int. Cl.
*F01N 3/28*  (2006.01)
*F01N 3/10*  (2006.01)
(Continued)

(52) U.S. Cl.
CPC .............. *F01N 3/281* (2013.01); *B01J 35/04* (2013.01); *B32B 15/01* (2013.01); *F01N 3/10* (2013.01);
(Continued)

(58) Field of Classification Search
None
See application file for complete search history.

(56) References Cited

U.S. PATENT DOCUMENTS

2002/0174770 A1* 11/2002 Badeau ............... C04B 38/0083
95/273

FOREIGN PATENT DOCUMENTS

DE      19938038       5/2000
DE      10225278       12/2003
(Continued)

OTHER PUBLICATIONS

Matusoka et al. JP-02273546A-translated document (Year: 1990).*
Matsuoka et al. (JP02273546A)-translated document (Year: 1990).*

*Primary Examiner* — Walter D. Griffin
*Assistant Examiner* — Jelitza M Perez
(74) *Attorney, Agent, or Firm* — Cozen O'Connor (57) ABSTRACT

A honeycomb body for exhaust-gas aftertreatment and a method for producing the honeycomb body for exhaust-gas aftertreatment, the honeycomb body having a housing and a honeycomb structure with a multiplicity of channels. The honeycomb structure is formed with a partially structured layer and a smooth layer the smooth layer provides that, in at least one axial portion of the honeycomb structure, a first cell density in an inner radial zone is increased in relation to a second cell density in an outer radial zone.

10 Claims, 3 Drawing Sheets

(51) Int. Cl.
*B32B 15/01* (2006.01)
*F01N 3/20* (2006.01)
*B01J 35/04* (2006.01)

(52) U.S. Cl.
CPC ............ *F01N 3/20* (2013.01); *F01N 2330/00* (2013.01); *F01N 2330/02* (2013.01); *F01N 2330/04* (2013.01); *F01N 2330/30* (2013.01); *F01N 2330/321* (2013.01); *F01N 2330/48* (2013.01); *F01N 2330/60* (2013.01)

(56) References Cited

FOREIGN PATENT DOCUMENTS

| | | | |
|---|---|---|---|
| EP | 0068862 | 1/1983 | |
| EP | 0068862 A2 * | 1/1983 | ............. B01D 59/32 |
| JP | 02273546 A * | 11/1990 | ........... F01N 3/2821 |
| JP | H02273546 A | 11/1990 | |
| JP | H03188925 | 8/1991 | |
| JP | H04150949 | 5/1992 | |
| JP | H04161252 | 6/1992 | |
| JP | H0929107 | 2/1997 | |
| JP | H10314601 A | 12/1998 | |

* cited by examiner

HONEYCOMB BODY FOR EXHAUST GAS AFTERTREATMENT

CROSS REFERENCE TO RELATED APPLICATIONS

This is a U.S. national stage of application No. PCT/EP2017/070645, filed on Aug. 15, 2017. Priority is claimed on German Application No. DE102016215289.0, filed Aug. 16, 2016, the content of which is incorporated herein by reference.

BACKGROUND OF THE INVENTION

1. Field of the Invention

The invention relates to a honeycomb body for exhaust-gas aftertreatment, and to a method for producing a honeycomb body for exhaust-gas aftertreatment. The honeycomb body may be used or implemented as a catalytic converter substrate body in exhaust-gas systems of mobile internal combustion engines. A honeycomb body of this type provides in particular a large surface area on which catalytically active material is positioned and brought into contact with the exhaust gas flowing through the honeycomb body. The invention is used in particular in the context of exhaust-gas purification in motor vehicles.

2. Description of the Prior Art

A multiplicity of different designs of honeycomb bodies for exhaust-gas aftertreatment are already known. A basic distinction is made between ceramic and metal honeycomb bodies. Owing to the simpler production process and the smaller wall thicknesses and thus the possibility of providing a larger surface area per unit of volume, metallic honeycomb bodies in particular have been used. A honeycomb body of this type may be constructed with smooth and/or structured metallic layers or sheet-metal foils. The metallic layers may be layered, wound and/or coiled and finally positioned in a housing of the honeycomb body, such that a multiplicity of channels through which the exhaust gas can flow are formed. Here, the channels may for example extend in rectilinear, wound and/or oblique between the end sides of a honeycomb body of said type.

With the aim of obtaining the most intimate possible contact between the exhaust gas and the walls of the honeycomb body, or with the catalytic coating located there, measures have already been proposed that reduce a laminar flow of the exhaust gas through the honeycomb body. For example, openings may be provided in the channel walls, such that intercommunicating channels are formed. It is likewise known for diverting structures, guide vanes etc. to be provided in the channels to achieve targeted flow diversion in the channels, pressure differences between the channels, or the like. Here, it must however be taken into consideration that, with an intensified diversion of the exhaust-gas flow within the honeycomb body, a pressure loss across the honeycomb body may be increased. This may lead to internal combustion engine power losses, because the back pressure thus formed can hinder the discharge of exhaust gas from the internal combustion engine.

In the field of automobile construction in particular, further demands are placed on a honeycomb body of this type, or on the production thereof. The focus is in particular on making the production process as inexpensive and simple as possible. Furthermore, it must also be taken into consideration that a honeycomb body of this type is subject to considerable thermal and/or dynamic load fluctuations in a mobile exhaust system, such that here, it is also the case that particularly high demands are placed on the durability of a honeycomb body of this type under said conditions.

Furthermore, in particular in certain regions of use of a honeycomb body, for example if the honeycomb body is arranged downstream of a diversion in the exhaust-gas tract and/or downstream of a bend in the exhaust-gas line, an inhomogeneous or non-uniform incident flow on the honeycomb body is unavoidable, or can be avoided only with relatively great outlay. This generally has the effect that such a honeycomb body cannot be flowed through in a uniform manner, such that the honeycomb body cannot be ideally utilized. For example, in the case of such an inhomogeneous incident flow, a purification action of the honeycomb body may be reduced, in particular because a catalytic coating that may be provided cannot be brought fully and/or ideally into contact with the exhaust gas, and/or individual or multiple channels of the honeycomb body, which are configured with a separation function may not be adequately flowed through.

SUMMARY OF THE INVENTION

It is an object of one aspect of the present invention to at least partially solve the problems highlighted with regard to the prior art. In particular, it is sought to specify a honeycomb body for exhaust-gas aftertreatment, and a method for producing a honeycomb body for exhaust-gas aftertreatment, which, in particular even in adverse installation situations of the honeycomb body in an exhaust system, permit the most uniform possible, or more uniform, throughflow of the honeycomb body. It is furthermore the intention for the honeycomb body to be producible as easily and inexpensively as possible.

The device and the method characterized by the features of the independent patent claims contribute to this. Further advantageous refinements are specified in the dependent patent claims. It should be pointed out that the features specified individually in the dependent patent claims may be combined with one another in any desired technologically meaningful way and define further embodiments of the invention. Furthermore, the features specified in the patent claims are rendered more precisely and explained in more detail in the description, with further preferred configurations of the invention being presented.

The honeycomb body for exhaust-gas aftertreatment has a housing and a honeycomb structure with a multiplicity of channels through which flow can pass, wherein the honeycomb structure is formed with at least one at least partially structured, in particular metallic, layer and with at least one, in particular metallic, smooth layer. A or at least one specific, cross section of the honeycomb structure has radial zones, wherein the at least one smooth layer is designed and positioned such that, in at least one axial portion of the honeycomb structure, a first cell density in an inner radial zone is increased in relation to a second cell density in an outer radial zone. In other words, this means in particular that a cross section of the honeycomb structure in at least one axial portion of the honeycomb structure has a differently configured radial zones, wherein the at least one smooth layer is designed and positioned such that in the at least one axial portion, a first cell density is provided in an inner radial zone, which first cell density is higher than a second cell density in an outer radial zone.

The proposed honeycomb body serves in particular for the aftertreatment of an exhaust gas of an internal combustion engine of a motor vehicle. The proposed honeycomb body has in particular a radially varying/different or variable/changeable flow resistance. The proposed honeycomb body, and the method yet to be proposed further below, advantageously permit, in particular even in adverse installation situations of the honeycomb body in an exhaust system, a uniform or more uniform throughflow of the honeycomb body, in particular because the flow resistance of the honeycomb body is targetedly reduced in the outer radial zone owing to the lower cell density. Despite the design of the honeycomb structure with radial zones of different cell density, the honeycomb body is advantageously relatively simple and inexpensive to produce, in particular because the different cell densities can be set exclusively by the design and positioning of the smooth layer. Furthermore, an additional support structure for holding the at least one at least partially structured layer is not imperatively necessary, because the smooth layer can prevent adjacent regions of the at least partially structured layer and/or adjacent at least partially structured layers from sliding into one another. Furthermore, it is possible for existing tools to be used for producing the honeycomb body, because it is possible there in particular for the winding process for winding such layer packs to be adapted in a technically simple manner.

The honeycomb body may basically take different forms, in particular a circular, oval, polygonal or similar cross section. A honeycomb body of this type is often formed with a tubular housing. Here, during operation, the exhaust gas generally enters via a first end side of the honeycomb body and exits again via a second end side of the honeycomb body. The end sides, which are preferably arranged substantially parallel to one another, generally define the axial length of the honeycomb body in the direction of a central axis of the honeycomb body, wherein the central axis extends through both end sides and is in particular arranged perpendicularly and centrally with respect to at least one, preferably both end sides.

The honeycomb body has at least one at least partially structured metallic layer. Here, it is possible for a single layer to have smooth and structured sections, or sections with different structuring. Here, the structure of the at least partially structured, preferably metallic, layer is preferably formed over the entire length, that is to say between the first end side and the second end side. The structure of the at least partially structured metallic layer is formed by elevations and depressions, which extend in particular from the first end side to the second end side and which are for example stamped into the layer. In cross section, the elevations and depressions may form a type of sinusoidal corrugation, a zigzag shape or the like. It is preferable for the at least one at least partially structured layer and the at least one smooth layer to extend over the entire axial length of the honeycomb body. The channels or the cross sections thereof may be delimited exclusively by a region of a structured layer and of a smooth layer.

A cross section of the honeycomb structure has radial zones with different cell density. It is possible for multiple cross sections, in particular spaced apart from one another along the central axis and/or in an axial direction, of the honeycomb structure to have radial zones with different cell density. The one or more cross sections of the honeycomb structure under consideration here lie(s) in each case in a cross-sectional plane oriented in particular orthogonally with respect to the central axis of the honeycomb body. The expressions "axial" and "radial" relate here to the central axis of the honeycomb body unless explicitly stated otherwise.

The at least one smooth layer is designed and positioned such that, in at least one axial portion of the honeycomb structure, a first cell density in an inner radial zone is increased in relation to a second cell density in an outer radial zone. It is preferable for multiple axial portions with radial zones of different cell density to be provided so as to be spaced apart from one another in particular along the central axis and/or in an axial direction in the honeycomb structure. It is furthermore preferable for the at least one axial portion to be spaced apart at least from the first end side or from the second end side of the honeycomb body. The radial zones preferably extend along the entire axial length of the honeycomb structure.

It is preferable if a ratio of second cell density to first cell density lies in the range from 0.1 to 0.7, particularly preferably in the range from 0.25 to 0.6. It is preferable if the first cell density lies in the range from 300 to 1000 cpsi cells per square inch, in particular in the range from 400 to 800 cpsi. It is furthermore preferable if the second cell density lies in the range from 100 to 600 cpsi, in particular in the range from 100 to 400 cpsi.

It is preferable if multiple outer radial zones, in particular with different cell densities, are provided, wherein the cell densities in the outer radial zones are each smaller than the cell density in the inner radial zone. The outer radial zone(s) is/are in particular arranged so as to at least partially, preferably fully, surround the inner radial zone. The inner radial zone is preferably arranged in the region of and/or around the central axis of the honeycomb body. It is furthermore preferable if the outer radial zone is arranged in the region of the housing or on the housing.

The inner radial zone may take different forms, in particular a circular, oval, polygonal, or similar cross section. The inner radial zone preferably has a size of at least 50 cm$^2$ [square centimeters]. The inner radial zone preferably has a size in the range from 70 to 85 cm$^2$. The outer radial zone may have a size of at least 70 cm$^2$. The outer radial zone preferably has a size in the range from 90 to 120 cm$^2$. It is furthermore preferable if a ratio of an inner cross-sectional area of the inner radial zone to an overall cross-sectional area of the inner and outer radial zones lies in the range from 0.3 to 0.6, in particular in the range from 0.4 to 0.5. It is preferable if at least the inner radial zone or the outer radial zone is arranged coaxially with respect to the central axis of the honeycomb body. In other words, the inner radial zone is preferably arranged centrally with respect to the cross section of the honeycomb structure.

It is preferable for at least the inner radial zone or the outer radial zone to be arranged at least in a manner dependent on an installation situation of the honeycomb body in an exhaust system or in a manner dependent on an incident-flow profile of an exhaust-gas flow incident on the honeycomb body. In this case, the inner radial zone may be positioned eccentrically with respect to the central axis of the honeycomb body. If the installation situation of the honeycomb body in the exhaust system or in the exhaust line is for example such that the honeycomb body is arranged directly downstream of a diversion in the exhaust system and/or downstream of a bend in the exhaust line, then the honeycomb body can be impinged on with a flow profile of the exhaust-gas flow which has a flow profile maximum arranged eccentrically with respect to the central axis of the honeycomb body. The incident-flow profile describes the distribution of the flow speed over the incident-flow cross section. The incident-flow profile maximum lies in particular in the region of the maximum incident-flow speed. It is preferable for the inner radial zone to be arranged centrally with respect to the incident flow on the honeycomb body, in particular centrally with respect to an incident-flow profile maximum of the exhaust-gas flow incident on the honeycomb body. The inner radial zone is particularly preferably arranged such that a central region of the inner radial zone spans or overlaps an incident-flow profile maximum of the exhaust-gas flow incident on the honeycomb body.

In one advantageous refinement, it is proposed that the at least one, or each, smooth layer is provided only in the inner radial zone. It is preferable if the at least one smooth layer extends over the entire axial length of the honeycomb body.

In a further advantageous embodiment, it is proposed that a smooth layer length of the at least one smooth layer is shorter in the outer radial zone than in the inner radial zone. The smooth layer length describes the extent of the smooth layer in the axial direction or the longitudinal direction of the honeycomb body. The smooth layer length preferably decreases in a radially outward direction. The smooth layer length particularly preferably decreases continuously, in particular linearly, in a radially outward direction. It is furthermore preferable if the smooth layer length has a maximum in the region of the inner radial zone and a minimum in the region of the outer radial zone. The smooth layer is preferably formed in the shape of a rhombus, wherein, in particular, two opposite tips of the rhombus point radially outward and two further opposite tips of the rhombus point toward the end sides of the honeycomb body. Those tips of the rhombus, which point toward the end sides of the honeycomb body, are particularly preferably each situated in a radially central region of the inner radial zone. It is preferable if the at least one smooth layer extends all the way through the inner radial zone and the outer radial zone only in the region of a central axial region of the honeycomb body.

In a further advantageous refinement, it is proposed that the at least one smooth layer has at least one recess in the outer radial zone, wherein a recess length of the of the same recess increases in a radially outward direction. The recess length describes the extent of the recess in the axial direction or the longitudinal direction of the honeycomb body. The recess length preferably increases continuously, in particular linearly, in a radially outward direction. The smooth layer is preferably formed in the shape of a double triangle, wherein, in particular, two opposite triangle base sides of the double triangle point toward the end sides of the honeycomb body, and wherein the limbs and/or tips of the two triangles of the double triangle converge, or are connected, in a central region of the length of the honeycomb body. It is preferable if the at least one smooth layer extends all the way through the inner radial zone and the outer radial zone only in the region of a first end side of the honeycomb body and/or in the region of a second end side of the honeycomb body.

In a further advantageous refinement, it is proposed that the at least one smooth layer has a multiplicity of holes in the outer radial zone, wherein at least a hole size or a hole density of the holes increases in a radially outward direction. Alternatively or in addition, a porosity of the at least one smooth layer may increase in a radially outward direction. It is also possible for holes to be provided in the inner radial zone, wherein said holes have in particular a smaller hole size and/or hole density than the holes in the outer radial zone. It is preferable if a hole diameter of the holes increases in a radially outward direction. It is furthermore preferable if a spacing between adjacent holes decreases in a radially outward direction. It is preferable if a hole size, or a hole diameter, of the holes lies in the range from 2 mm to 20 mm [millimeters], in particular in the range from 5 mm to 15 mm. It is preferable if the at least one smooth layer extends all the way through the inner radial zone and the outer radial zone only in the region of a first end side of the honeycomb body and/or in the region of a second end side of the honeycomb body. It is furthermore preferable if the at least one smooth layer extends all the way through the inner radial zone and the outer radial zone only in at least one axial region arranged between the holes.

In one advantageous embodiment, it is proposed that at least a first edge or a second edge of the at least one smooth layer has an undulating profile with a maximum in the region of the inner radial zone and a minimum in the region of the outer radial zone. The smooth layer is preferably arranged such that the first edge points toward the first end side of the honeycomb body and the second edge points toward the second end side of the honeycomb body. The profile of the first edge and/or of the second edge may form a type of sinusoidal undulation, zigzag shape or the like. The undulating profile of the first edge and/or second edge is in particular formed such that the maximum and the minimum of the profile extend in, or counter to, the axial direction of the honeycomb body. Thus, the smooth layer is of smooth form even in the region of the profiled first edge and/or second edge. It is preferable if only the first edge or the second edge has the undulating profile.

In one advantageous refinement, it is proposed that the channels extend from a first inlet end side of the honeycomb body to a second outlet end side of the honeycomb body, wherein the channels run obliquely with respect to a central axis of the honeycomb body. It is preferable for the structure of the at least partially structured layer, or of the elevations and depressions of the at least partially structured layer, to be arranged in the honeycomb body so as to run obliquely with respect to the central axis. In this way, in particular, channels are formed that run not parallel but obliquely with respect to the central axis. The structure is particularly preferably implemented such that the elevations and depressions in adjacent regions as viewed in the radial direction, and/or in adjacent layers, are inclined differently and/or have a different orientation than one another. It is very particularly preferable for said alignment and/or orientation to alternate constantly as viewed in a radial direction. This has the effect in particular that the elevations and depressions lie linearly against one another at least partially and preferably nowhere in the honeycomb body, but rather cross one another and thus form substantially only punctiform abutment points with one another. This can yield a construction in which partial exhaust-gas flows are permanently diverted and can flow into adjacent elevations and depressions, in particular in zigzag fashion. It is preferable if an angle between the elevations or depressions and the central axis amounts to at most 20° [angular degrees]. It may be provided in particular that the angle lies in a range from 1° to 10° and very particularly preferably in the range from 2° to 6°. Channels which run obliquely with respect to the central axis of the honeycomb body are advantageous in particular if the at least one smooth layer is provided only in the inner radial zone. In this case, the crossing elevations and depressions can advantageously prevent the, at least partially, structured layer(s) in the outer radial zone from sliding into one another.

In one advantageous embodiment, it is proposed that the honeycomb body is of conical form. It is preferable for at least the housing of the honeycomb body or the honeycomb structure to be formed in the manner of a cone. Here, the channels may likewise widen and/or narrow in conical fashion. It is preferable if an angle between a housing wall and the central axis of the honeycomb body lies in the range from 0.5° to 5° [angular degrees], in particular in the range from 1° to 2°. A conical honeycomb body, or a conical housing of the honeycomb body, is advantageous in particular if the smooth layer length has a minimum in the region of the outer radial zone and/or if only the first edge or the second edge of the at least one smooth layer has an undulating profile with a minimum in the region of the outer radial zone. In this case, it is possible for a reduction in preload that may arise within the honeycomb structure in the axial region of the minimum to be advantageously counteracted by the conical shape of the honeycomb body or of the housing.

It is preferable for the at least one smooth layer to be formed symmetrically with respect to a central line, oriented in particular parallel to an axial direction of the honeycomb body, of the smooth layer. It is preferable if the at least one smooth layer extends at least partially to two in particular substantially opposite regions of the housing. It is furthermore preferable if two opposite edges of the at least one smooth layer partially and/or two opposite edges of the at least one at least partially structured layer make contact with a housing inner side.

The honeycomb structure comprises the at least one at least partially structured metallic layer, and the at least one metallic smooth layer, which may be wound, coiled and/or stacked. The honeycomb structure is preferably produced with a stack, comprising the at least one at least partially structured metallic layer and the at least one metallic smooth layer, which is wound in S-shaped fashion. If multiple stacks are used, these can be arranged adjacent to one another, and wound with one another, as a U-shaped and/or V-shaped arrangement and inserted into a housing. Both configurations normally have in common the fact that all of the ends of the stack and/or layers are directed to the outside that is to say bear against a housing, whereas the bends (s, v, u) are positioned at the inside. It is preferably the case that, in the stack, at least partially structured layers and smooth layers are present in alternating fashion, said layers in each case delimiting channels of the honeycomb body. The walls of the channels may be smooth flat and/or free from fixtures in the profile direction of the channels and/or may have projections, blades, holes and/or diverting surfaces for the exhaust gas. It is accordingly possible for an exhaust-gas flow that passes through the disk-shaped honeycomb bodies to be homogenized and/or mixed for example with regard to flow speed, partial flow direction, temperature and/or the like.

According to a further aspect, a method for producing a honeycomb body for exhaust-gas aftertreatment is proposed, wherein the honeycomb body has at least one housing and a honeycomb structure with a multiplicity of channels which can in particular be flowed through, wherein a cross section of the honeycomb structure has different radial zones, and wherein the method comprises at least the following steps:
a) providing at least one at least partially structured layer,
b) providing at least one smooth layer,
c) arranging and winding the layers to form the honeycomb structure,
d) inserting the honeycomb structure into the housing,
e) connecting the honeycomb structure to the housing,
wherein the at least one smooth layer is designed and positioned such that, in at least one axial portion of the honeycomb structure, a first cell density in an inner radial zone is increased in relation to a second cell density in an outer radial zone.

The method is preferably used for producing a honeycomb body proposed here. The indicated sequence of the method steps arises during a normal execution of the method. Individual or all method steps may be performed at the same time, in succession and/or at least partially in parallel.

It is preferable if the at least one smooth layer, in step b), is provided with such a shaping, or is shaped and/or processed, such that the smooth layer, in particular when it is arranged or oriented in the intended manner relative to the at least one at least partially structured layer in step c), provides, in an inner radial zone, a first cell density greater than a second cell density in an outer radial zone. It is preferable if the connection in step e) is performed by a thermal joining process, in particular by a welding process or a hard soldering process.

The details, features and advantageous embodiments discussed in conjunction with the honeycomb body may also arise correspondingly in the case of the method proposed here, and vice versa. In this respect, for the more detailed characterization of the features, reference is made to the entirety of the statements made there.

According to a further aspect, there is proposed in particular a use of a honeycomb body proposed here for exhaust-gas aftertreatment, preferably for the aftertreatment of an exhaust gas of an internal combustion engine of a motor vehicle. The details, features and advantageous embodiments discussed above in conjunction with the honeycomb body and/or the method may also arise correspondingly in the case of the use proposed here, and vice versa. In this respect, for the more detailed characterization of the features, reference is made to the entirety of the statements made there.

According to a further aspect, there is proposed in particular a motor vehicle, having an internal combustion engine with an exhaust system, wherein the exhaust system has at least one catalytic converter substrate or a particle separator that is formed with a honeycomb body as described here. Here, the catalytic converter substrate and/or the particle separator may have a catalytically active coating, which may if appropriate also be configured differently in axial sub-sections of the honeycomb body.

BRIEF DESCRIPTION OF THE DRAWINGS

The invention and the technical field will be explained in more detail below on the basis of the figures. It is pointed out that the invention is not restricted by the exemplary embodiments presented. In particular, unless explicitly indicated otherwise, it is also possible to extract partial aspects of the substantive matter explained in the figures and combine these with other constituents and/or knowledge from other figures and/or from the present description. In the figures, in each case schematically.

DETAILED DESCRIPTION OF THE PRESENTLY PREFERRED EMBODIMENTS

Figure 1:
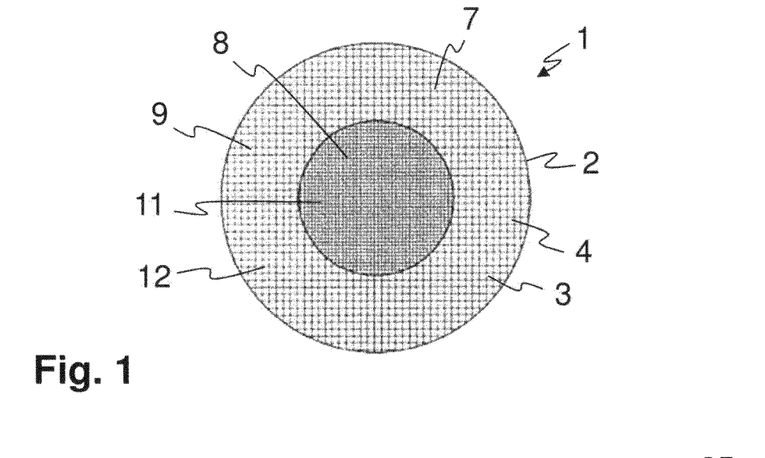
FIG. 1 is a front view of a honeycomb body with radial zones of different cell density.

FIG. 1 schematically shows a front view of a honeycomb body 1 with radial zones 8, 9 of different cell density. The honeycomb body 1 has a housing 2 and a honeycomb structure 3 with a multiplicity of channels 4. A cross section 7 of the honeycomb structure 3 has radial zones with different cell density, wherein a first cell density 11 in an inner radial zone 8 is increased in relation to a second cell density 12 in an outer radial zone 9.

Figure 2:
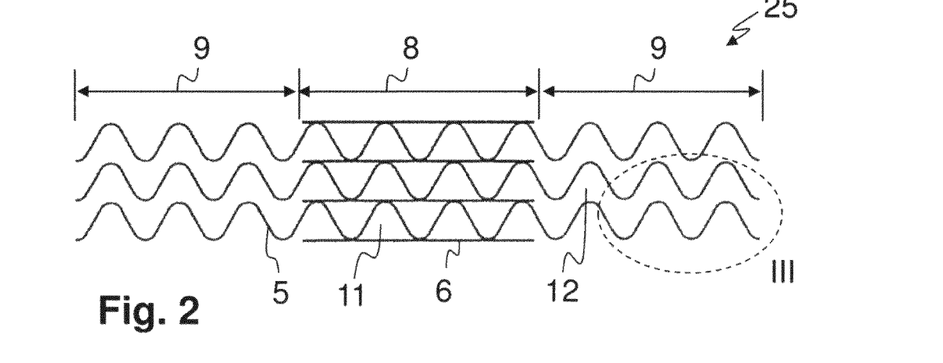
FIG. 2 is a front view of a stack.

FIG. 2 schematically shows a front view of a stack 25, comprising three at least partially structured metallic layers 5 and four metallic smooth layers 6. The stack 25 may for example be wound or coiled in S-shaped fashion to form a honeycomb structure for a honeycomb body. It is illustrated in FIG. 2 that the smooth layer 6 is designed and positioned such that, in at least one axial portion of the honeycomb structure, a first cell density 11 in an inner radial zone 8 is increased in relation to a second cell density 12 in an outer radial zone 9. For this purpose, by way of example, the smooth layers 6 are provided only in the inner radial zone 8. By means of the design and arrangement of the smooth layer as per FIG. 2, a first cell density 11 is attained in the inner radial zone 8, which first cell density is twice as great as the second cell density 12 in the outer radial zone 9. Since the radial zones 8, 9 are first formed when the stack 25 is wound or coiled to form the honeycomb structure, the subsequent assignment of regions of the stack 25 to the radial zones 8, 9 is merely indicated in FIG. 2.

Figure 3:
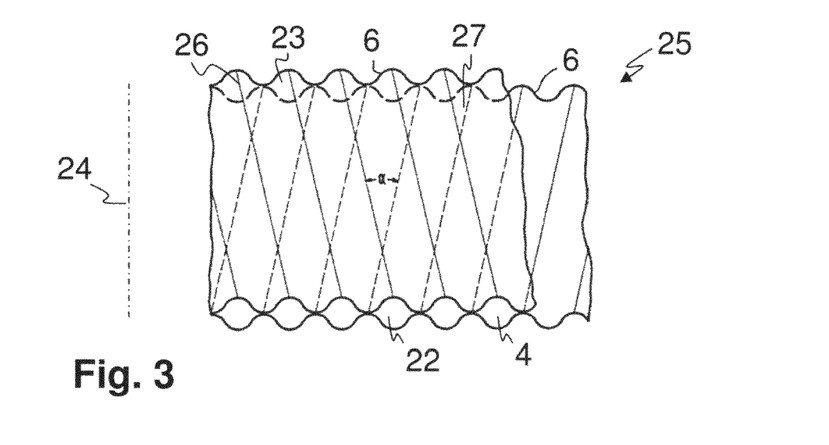
FIG. 3 is a detail view of the stack from FIG. 2.

FIG. 3 shows a detail view of the stack 25 from FIG. 2. The detail view as per FIG. 3 relates to the arrangement of the at least partially structured layers 6 relative to one another. As per the illustration in FIG. 3, the channels 4 extend from a first end side 22 of the honeycomb body to a second end side 23 of the honeycomb body, wherein the channels 4 run obliquely with respect to a central axis 24 of the honeycomb body, which is merely indicated in FIG. 3 for orientation. To form the obliquely running channels 4, elevations 26 and depressions 27 of the at least partially structured layers 6 are arranged so as to run obliquely with respect to one another and with respect to the central axis 24. For illustrative purposes, an angle α between the elevations 26 and depressions 27 is plotted in FIG. 3. The crossing elevations 26 and depressions 27 offer the advantage here that the at least partially structured layers 6 cannot slide into one another even in the outer radial zone 9, in which, in the example shown in FIG. 2 and FIG. 3, no smooth layer is provided between the at least partially structured layers 6.

Figure 4:
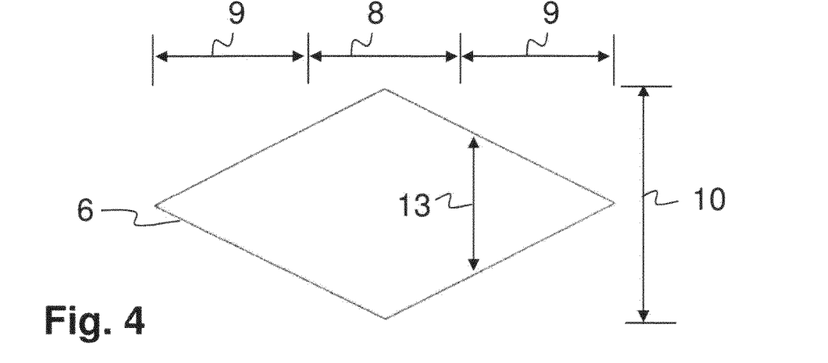
FIG. 4 is a plan view of a smooth layer.

FIG. 4 shows a plan view of a smooth layer 6, which is designed and positionable such that, in one axial portion 10 of the honeycomb structure, a first cell density in an inner radial zone 8 is increased in relation to a second cell density in an outer radial zone 9. For this purpose, by way of example, a smooth layer length 13 of the smooth layer 6 is shorter in the outer radial zone 9 than in the inner radial zone 8. It is also illustrated in FIG. 4 that the smooth layer length 13 decreases continuously, in this case even linearly, in a radially outward direction. Here, the smooth layer 6 is formed in the manner of a rhombus. The fact that the smooth layer 6 as per the illustration in FIG. 4 is provided both in the inner radial zone 8 and in the outer radial zone 9 offers the advantage that the at least partially structured layers in both zones can be prevented from sliding into one another.

Figure 5:
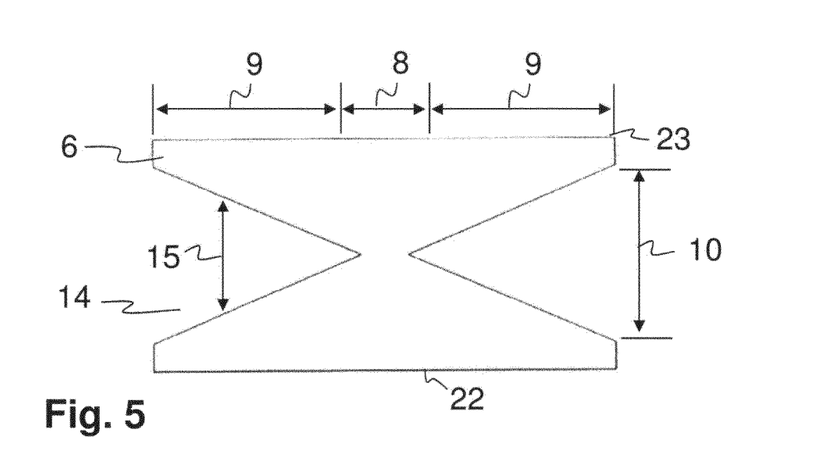
FIG. 5 is a plan view of a further smooth layer.

FIG. 5 shows a plan view of a further smooth layer 6, which is designed and positionable such that, in one axial portion 10 of the honeycomb structure, a first cell density in an inner radial zone 8 is increased in relation to a second cell density in an outer radial zone 9. For this purpose, the smooth layer 6 has, by way of example, a recess 14 in the outer radial zone 9, wherein a recess length 15 of the recess 14 increases continuously in a radially outward direction. Here, the smooth layer 6 is formed in the manner of a double triangle. The fact that the smooth layer 6 as per the illustration in FIG. 5 extends all the way through the inner radial zone 8 and the outer radial zone 9 in the region of a first end side 22 of the honeycomb body and in the region of a second end side 23 of the honeycomb body offers the advantage that a preload and good solderability of the honeycomb structure can be maintained at the first end side 22 and at the second end side 23.

Figure 6:
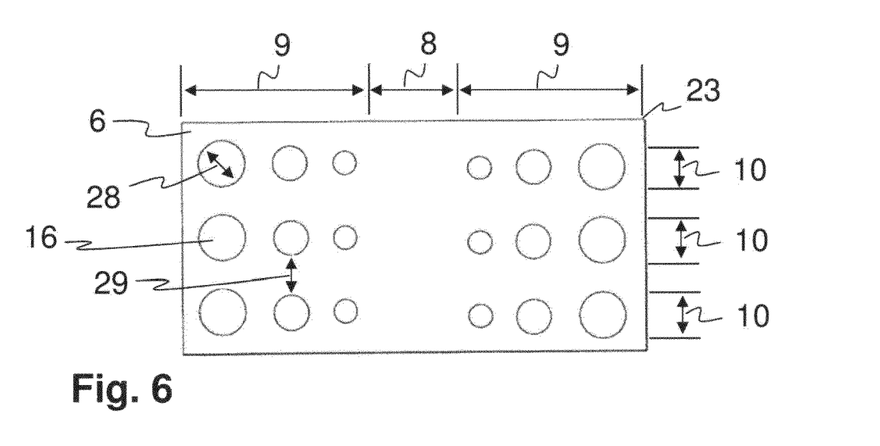
FIG. 6 is a plan view of a further smooth layer.

FIG. 6 shows a plan view of a further smooth layer 6, which is designed and positionable such that, in three axial portions 10 of the honeycomb structure, a first cell density in an inner radial zone 8 is increased in relation to a second cell density in an outer radial zone 9. For this purpose, the smooth layer 6 has a multiplicity of holes 16 in the outer radial zone 9, wherein a hole size 28 and a hole density 29 of the holes 16 increases in a radially outward direction. The fact that the smooth layer 6 as per the illustration in FIG. 6 extends all the way through the inner radial zone 8 and the outer radial zone 9 in multiple axial regions of the honeycomb body offers the advantage that a preload and good solderability can be maintained in virtually the entire honeycomb structure.

Figure 7:
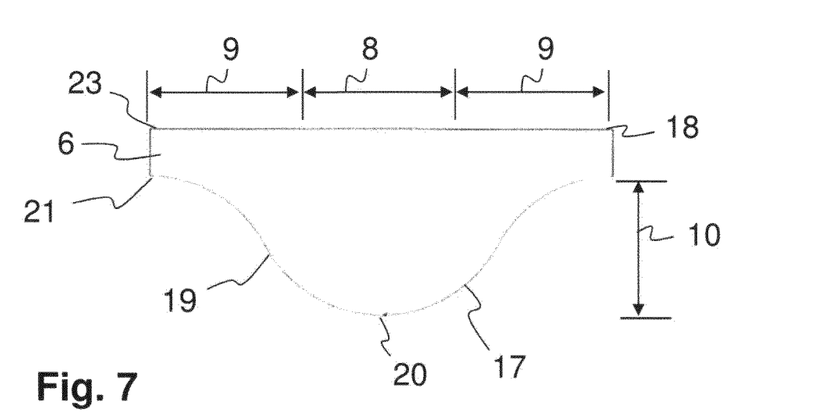
FIG. 7 is a plan view of a further smooth layer.

FIG. 7 shows a plan view of a further smooth layer 6, which is designed and positionable such that, in one axial portion 10 of the honeycomb structure, a first cell density in an inner radial zone 8 is increased in relation to a second cell density in an outer radial zone 9. For this purpose, a first edge 17 of the smooth layer 6 has an undulating profile 19 with a maximum 20 in the region of the inner radial zone 8 and a minimum 21 in the region of the outer radial zone 9. A second edge 28 of the smooth layer 6 is of rectilinear design, such that, in the region of a second end side 23 of the honeycomb body, the smooth layer extends all the way through the inner radial zone 8 and the outer radial zone 9. This offers the advantage that, at the second end side 23, a preload and good solderability of the honeycomb structure can be maintained. Furthermore, the shape of the smooth layer 6 shown in FIG. 7 offers the advantage that the smooth layer 6 can be produced virtually without waste, for example from a strip.

Figure 8:
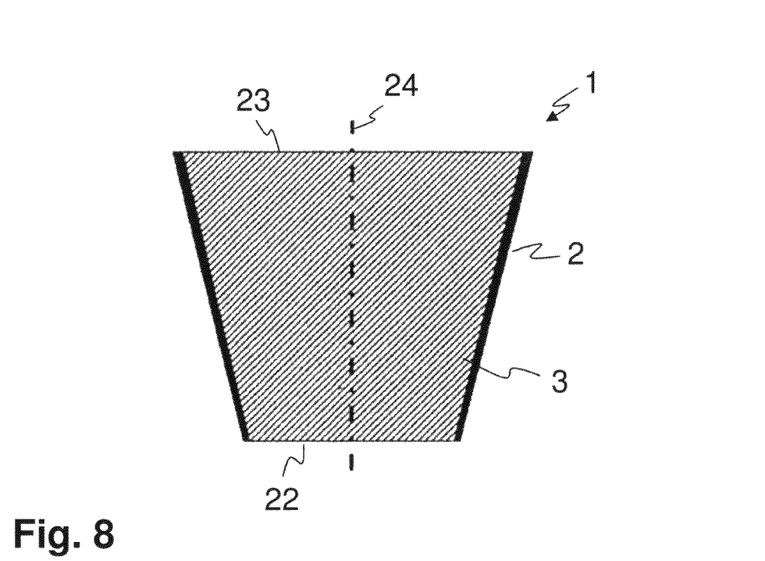
FIG. 8 is a sectional illustration of a conical honeycomb body.

FIG. 8 schematically shows a sectional illustration of a conical honeycomb body 1. The honeycomb body 1 has a central axis 24. In the illustration of FIG. 8, it can be seen that the housing 2 of the honeycomb body 1 and the honeycomb structure 3, arranged and held in the housing 2, of the honeycomb body 1 widen conically from the first end side 22 of the honeycomb body 1 to the second end side 23 of the honeycomb body 1. A conical honeycomb body 1 of said type is for example advantageous if the at least one smooth layer is formed as per the illustration in FIG. 7. Then, the axially variable preload of the honeycomb structure 3 that arises during the winding of the at least one smooth layer can be virtually compensated by means of a slight tapering of the housing 2 of the honeycomb body 1.

Here, a honeycomb body for exhaust-gas aftertreatment and a method for producing a honeycomb body for exhaust-gas aftertreatment are specified which at least partially solve the problems highlighted with regard to the prior art. In particular, the honeycomb body and the method permits the most uniform possible throughflow, or a more uniform throughflow, of the honeycomb body. Furthermore, the honeycomb body can be produced easily and inexpensively.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A honeycomb body for exhaust-gas aftertreatment, comprising:
   a housing; and
   a honeycomb structure with a multiplicity of channels, comprising:
      radial zones of a cross section of the honeycomb structure;
      at least one smooth layer; and
      at least one at least partially structured layer;
      a first cell density in an inner radial zone; and
      a second cell density in an outer radial zone;
   wherein the at least one smooth layer is configured such that, in at least one axial portion of the honeycomb structure, the first cell density is increased in relation to the second cell density, and
   wherein the at least one smooth layer is uninterrupted in the inner radial zone.

2. The honeycomb body for exhaust-gas aftertreatment, comprising:
   a housing; and
   a honeycomb structure with a multiplicity of channels, comprising:
   radial zones of a cross section of the honeycomb structure;
   at least one smooth layer; and
   at least one at least partially structured layer; a first cell density in an inner radial zone; and
   a second cell density in an outer radial zone;
   wherein the at least one smooth layer is configured such that, in at least one axial portion of the honeycomb structure, the first cell density is increased in relation to the second cell density,
   wherein the at least one smooth layer is provided only in the inner radial zone.

3. The honeycomb body for exhaust-gas aftertreatment, comprising:
   a housing; and
   a honeycomb structure with a multiplicity of channels, comprising:
   radial zones of a cross section of the honeycomb structure;
   at least one smooth layer; and
   at least one at least partially structured layer; a first cell density in an inner radial zone; and
   a second cell density in an outer radial zone;
   wherein the at least one smooth layer is configured such that, in at least one axial portion of the honeycomb structure, the first cell density is increased in relation to the second cell density,
   wherein a respective smooth layer length of the at least one smooth layer is shorter in the outer radial zone than in the inner radial zone.

4. The honeycomb body as claimed in claim 3, wherein the respective smooth layer length decreases in a radially outward direction.

5. The honeycomb body as claimed in claim 1, wherein the at least one smooth layer has at least one recess in the outer radial zone, and wherein a recess length of the at least one recess increases in a radially outward direction.

6. The honeycomb body as claimed in claim 1, wherein the at least one smooth layer has a multiplicity of holes in the outer radial zone, and wherein at least one of a hole size and a hole density increases in a radially outward direction.

7. The honeycomb body as claimed in claim 1, wherein at least one of a first edge and a second edge of the at least one smooth layer has a profile with a maximum in a region of the inner radial zone and a minimum in a region of the outer radial zone.

8. The honeycomb body as claimed in claim 1, wherein the multiplicity of channels extend from a first end side of the honeycomb body to a second end side of the honeycomb body, and wherein the multiplicity of channels run obliquely with respect to a central axis of the honeycomb body.

9. The honeycomb body as claimed in claim 1, wherein the honeycomb body is of conical form.

10. A method for producing a honeycomb body for exhaust-gas aftertreatment, wherein the honeycomb body has at least one housing and a honeycomb structure with a multiplicity of channels, wherein a cross section of the honeycomb structure has radial zones, the method comprises:
    a) providing at least one at least partially structured layer;
    b) providing at least one smooth layer;
    c) arranging and winding the at least one at least partially structured layer and the at least one smooth layer to form the honeycomb structure;
    d) inserting the honeycomb structure into the housing;
    e) connecting the honeycomb structure to the housing;
    wherein the at least one smooth layer is positioned such that, in at least one axial portion of the honeycomb structure, a first cell density in an inner radial zone is increased in relation to a second cell density in an outer radial zone, and
    wherein the at least one smooth layer is uninterrupted in the inner radial zone.

* * * * *